United States Patent [19]

Lewis et al.

[11] Patent Number: 6,001,407
[45] Date of Patent: Dec. 14, 1999

[54] QUICK-COOKING DEHYDRATED VEGETABLES

[75] Inventors: Victor Marcus Lewis; David Adrian Lewis, both of Australian, Australia

[73] Assignee: Byron Agricultural Company Pty. Ltd., Australia

[21] Appl. No.: 08/022,174

[22] Filed: Feb. 25, 1993

[30] Foreign Application Priority Data

Feb. 26, 1992 [AU] Australia ................................ PL1099

[51] Int. Cl.⁶ .................................................. A23B 7/022
[52] U.S. Cl. ........................ 426/443; 426/456; 426/615; 426/640
[58] Field of Search .................................... 426/443, 456, 426/638, 640, 384, 385, 615

[56] References Cited

U.S. PATENT DOCUMENTS

| | | |
|---|---|---|
| 2,297,502 | 9/1942 | Rudolph . |
| 3,821,435 | 6/1974 | Blake et al. . |
| 4,088,790 | 5/1978 | Bevan et al. ............................... 426/96 |
| 4,447,460 | 5/1984 | Lewis et al. . |
| 4,683,141 | 7/1987 | Lewis et al. . |
| 4,832,969 | 5/1989 | Lioutas .................................... 426/270 |

OTHER PUBLICATIONS

S. Kuppuswamy and R. Gururaja Rao, *J. Food Sci. Tech.,* Mysore & Suppl. (1970) p. 18–21; "Dehydration of Green Peas".

*Primary Examiner*—Curtis E. Sherrer
*Attorney, Agent, or Firm*—Scully, Scott, Murphy & Presser

[57] ABSTRACT

Dehydrated vegetable pieces having incorporated therein a mixture of sodium chloride of concentrations of at least 2% and an alkali metal carboxylate at a concentration of 1 to 4%.

13 Claims, No Drawings

QUICK-COOKING DEHYDRATED VEGETABLES

BACKGROUND OF THE INVENTION

Dried vegetables are important articles of commerce and are used extensively in the food industry in soups, casseroles, dried packaged foods of various types and many other processed food applications.

Conventional dried vegetables are usually prepared from blanched pieces of vegetable which are dried in hot air to a moisture content of about 5%. These vegetable pieces take a considerable time to rehydrate, in the order of 5 to 20 minutes depending on the dimensions of the piece.

The current consumer demand for convenience food products has created a requirement for many types of packaged "instant" foods. These vary for example from soup mixes that can be used after rehydration for 60 seconds with the addition of boiling water, to products with stove-top or microwave cook-times of two to five minutes.

A range of freeze-dried vegetable pieces is available with rapid rehydration times. These suffer from the disadvantage of being very expensive and very fragile. In addition, in mixes, because of their low bulk density, they tend to float on top of the product rather than incorporate within it as would a fresh vegetable.

DISCUSSION OF PRIOR ART

U.S. Pat. Nos. 4,447,460 and 4,683,141 (Lewis and Lewis) describe a method for producing quick-cooking dehydrated vegetables by the controlled incorporation of sodium chloride during drying. U.S. Pat. No. 2,297,502 (Rudolph) describes the cooking of dry yellow pea cotyledons with sodium citrate solution for long periods to aid in the disintegration of the peas. U.S. Pat. No. 3,821,435 (Blake and Pendlington) describes the use of sodium citrate to prepare quick cooking vegetables for dry vegetable soup mixes.

The patent of Blake et al describes the addition of at least one gram of sodium citrate to every 20 grams of dried vegetable pieces, with a preferred rate of one gram of sodium citrate to every 10 grams of vegetables. Methods are described for incorporating the citrate into the vegetables in the required (at least 5% by weight) amount. Dipping the vegetables in the citrate solution prior to drying (i.e. pre-steeping) is mentioned. However, in all the specific examples set forth in U.S. Pat. No. 3,821,435 none of the vegetables used has been pre-steeped in (impregnated with) citrate. The subsequent Lewis U.S. Pat. Nos. 4,447,460 and 4,683,141 describe, in some detail, the limitations of pre-steeping in the industrial processing of vegetables.

Kuppuswany and Rao (J. Food Sci Tech, Mysore & Suppl. 1970, 18–21) describe a method for the dehydration of peas in which sodium citrate soaking of green peas for 12–16 hours, is described to produce a quicker cooking dehydrated pea without a wrinkled skin.

In our research leading up to the present invention, an examination of the use of sodium citrate incorporated into a range of vegetables, in concentrations specified in U.S. Pat. No 3,821,435, has shown us that the use of 5% or more sodium citrate, incorporated into these vegetables, results in a very pronounced softening of the vegetable tissue, to the extent that the product on cooking becomes slimy or mushy. Thus, whilst the addition of citrate within the vegetable is very effective in softening the vegetable, the resultant texture of the vegetable piece lacks the desirable natural texture of a well cooked piece of fresh vegetable.

In Lewis U.S. Pat. No. 4,447,460, the products described rehydrate at a rate equivalent to the citrate containing vegetables. However, when adequately rehydrated, they are well cooked, have a typical cooked fresh vegetable texture, and are not at all mushy or slimy.

We have also found that when a dehydrated vegetable is cooked in water containing sodium citrate at a level of 5% or more of the weight of the dehydrated vegetables, the time taken to cook is 50% to 100% longer to reach the same degree of softness as where the citrate is incorporated within the vegetable prior to cooking.

SUMMARY OF THE INVENTION

We have now found, most surprisingly against the cumulative background of the mentioned prior art, that if a combination of sodium chloride and an alkali metal carboxylate (preferably sodium citrate) at concentrations of between 1 and 4%, is incorporated into dehydrated vegetable pieces prior to cooking a cooking rate is achieved quicker than could be expected if each salt were used independently. Moreover the sodium chloride, in levels of 2% or higher, surprisingly prevents the alkali metal carboxylate, from causing mushiness or sliminess in the cooked vegetables. In some way, the presence of sodium chloride within the vegetable with the alkali metal carboxylate cause the vegetable to retain its crispness on cooking and avoid the mushy texture observed when alkali metal carboxylate alone is used.

The term crispness is used herein to describe the desirable texture of freshly cooked vegetables and does not infer a lack of tender texture.

Accordingly, in one broad aspect, the invention provides a dehydrated vegetable piece, capable of being readily cooked (rehydrated), characterized by having incorporated therein prior to cooking, sodium chloride and an alkali metal carboxylate, the sodium chloride being present in a concentration of at least 2%, and the alkali metal carboxylate being present in a concentration of 1–4%, the percentages being by weight of the dehydrated vegetable piece.

In a related aspect, the invention provides a method for preparing such dehydrated vegetable pieces by incorporating therein prior to cooking, sodium chloride and alkali metal carboxylate component in the stated range.

As the alkali metal carboxylate component, sodium citrate is the preferred example (reference to "sodium citrate" is to be understood as embracing this particular sodium salt in all its various forms). However potassium and other alkali metal carboxylates may of course also be employed, such as a succinate, lactate, malonate or the like but these are not as effective as the citrate. A preferred upper limit for the sodium chloride component is, for example, 15%.

Whilst it is believed that the teachings of this invention are applicable to all types of vegetables it has been established that potatoes except sweet potatoes, cannot be processed in accordance with the invention. Potatoes however are not affected by treatment with alkali metal carboxylate and the term vegetable pieces as used herein is to be understood as excluding potatoes.

The invention will now be further described with reference to preferred performance features. It will be appreciated that such features are intended to be illustrative of the invention, and therefore should not be limitatively construed.

PREFERRED EMBODIMENTS

A range of vegetables selected from beet, broccoli, green beans, carrot, cabbage, celery root, celery stalk, egg plant, stem ginger, mushrooms, onions, peppers, parsnip, parsley, peas, sweet corn, sweet potatoes and zucchini are cut to form vegetable pieces of the required size. Pieces from the same vegetable are then processed to incorporate in the pieces the stated concentrations of sodium chloride and sodium citrate either by steeping or osmosis. In the case of the former the vegetable pieces are:

(a) partially dehydrated to the extent wherein the residual moisture content is between 10 and 45%;

(b) adding to the partially dehydrated vegetable pieces a predetermined volume of a solution containing a known quantity of a solute comprising sodium chloride and sodium citrate in the mentioned concentrations, the quantity of the solution being such that it is totally absorbed by the vegetable.

The temperature of the solution is not critical and the solution is totally absorbed in an extremely short space of time (see U.S. Pat. No. 4,447,460).

In the case of osmosis the vegetable pieces are mixed with a finely divided dry mix of the salts immediately prior to commencement of or during early stages of dehydration. In this latter method, a concentrated solution of the salts is formed by osmosis on the surface of the vegetable pieces which becomes incorporated into the piece during dehydration. By knowing the total solids in the prepared vegetable prior to dehydration and the projected final moisture content, it is possible to calculate the amount of the selected salts to be added to give the final desired salt level in the dehydrated vegetable. In addition to the salts, other ingredients such as sugars, flavourings, colorants, nutritional additives, preservatives, antioxidants etc., may also be added.

After solute addition the vegetables are then dried in any conventional way to give a shelf-stable product.

Dehydrated vegetables prepared in this way can produce edible products with cooking times from virtually instant (i.e. cook in 1 minute on addition of boiling water) upwards. The cook time is dependent on the dimensions of the vegetable piece and the concentration of salts used. As indicated above, other alkali metal citrates and salts of carboxylic acids may of course be used. However sodium citrate is our preferred second component.

Proceeding with preferred performance features, the cook-time of vegetables containing the sodium chloride-sodium citrate mix with, for example, carrot dice, may vary from virtually instant for a dice with a thickness before dehydration of 2 mm to about 4 minutes for a dice with a thickness of 5 mm.

Furthermore it has been found that dehydrated vegetables of a particular dimension with excellent cooking characteristics, i.e. well cooked but still crisp texture can be prepared at accurately controlled cook times if a level of sodium chloride of 2% to 5% of salt is incorporated into that vegetable, and at the same time incorporating levels of sodium citrate between 1% and 4%. In this way, mushiness or sliminess is avoided and a wide variation in cook times can be achieved. This is often very important so as to have a vegetable ingredient cook in the same time as the major ingredient in a pack, e.g. rice or pasta.

EXAMPLE 1

Red Bell Peppers

Ripe red bell peppers were cored and then cut into dice 10 mm×10 mm. They were then divided into five portions, and treated as follows:

(A) The dice were not further treated but were dried to a moisture content of 6%.

(B) Dice were quickly mixed with a quantity of sodium chloride such that after drying to 6% moisture, the peppers contained 4% of sodium chloride.

(C) As in (B) the dice were mixed with a mixture of sodium chloride and sodium citrate such that after drying to 6% moisture, the peppers contained 4% sodium chloride and 4% sodium citrate.

(D) As in (B), the dice were mixed with a level of sodium citrate such that after drying to 6% moisture, the peppers contained 4% sodium citrate.

(E) As in (B) the dice were mixed with a level of sodium citrate such that after drying to 6% moisture, the peppers contained 6% sodium citrate.

After preparation, 5 g of dehydrated pepper dice were cooked by simmering in 100 ml of boiling water for 4 minutes, and subjected to taste tests to determine the texture of the products. The results are shown in Table I. In the following Tables the texture evaluation was made by sensory evaluation using a trained tasting panel.

TABLE I

| TREATMENT | SALT LEVEL | SODIUM CITRATE LEVEL | TEXTURE EVALUATION |
| --- | --- | --- | --- |
| A | 0 | 0 | Firm and tough - not sufficiently cooked. |
| B | 4 | 0 | Crisp texture, but not quite soft enough. |
| C | 4 | 4 | Firm but well cooked |
| D | — | 4 | Not quite cooked. Soft on outside lacks crispness inside |
| E | — | 6 | Cooked but pulpy |

Sample A was also cooked with the addition of 6% sodium citrate to the cook water. The pepper to which the sodium citrate was added in the cook water took about 6 minutes to cook to the same extent as sample E cooked for 4 minutes was similarly pulpy, with a slimy surface texture.

EXAMPLE 2

Diced Carrots

Fresh carrots were peeled, diced 10 mm×5 mm, blanched in steam for 3 minutes and surface dried. The carrots were divided into four batches and each batch was mixed quickly with the salt or salt mix shown in table II in such quantity that when the carrots were dried to 6% moisture they contained the nominated percentage of the contained salt(s).

10 g of carrots were added to 100 ml of boiling water and allowed to simmer for 3 and 5 minutes. After the allotted time, the water was drained off and the carrots washed quickly in cold water to prevent further cooking.

TABLE II

| TREATMENT | SODIUM CHLORIDE | SODIUM CITRATE | TEXTURE EVALUATION |
| --- | --- | --- | --- |
| 3 MINUTE COOK | | | |
| A | — | 6 | Pulpy, slimy on the outside but hard in the centre |
| B | — | 4 | Slimy on outside not as pulpy as A. |
| C | 4 | 4 | Good texture. Not slimy or pulpy. |
| D | 3 | 3 | Cooked but crisp. Good texture. |
| 5 MINUTE COOK | | | |
| A | — | 6 | Over soft and pulpy. |

TABLE II-continued

| TREATMENT | SODIUM CHLORIDE | SODIUM CITRATE | TEXTURE EVALUATION |
|---|---|---|---|
| B | - | 4 | Pulpy, but not as much so as (A). |
| C | 4 | 4 | Firmer and crisper than (B). |
| D | 3 | 3 | Best texture, well cooked and rehydrated but sufficiently firm. |

EXAMPLE 3

Carrot Shreds

Carrots were peeled and sliced into 3 mm×4 mm shreds, blanched in steam for 2 minutes and premixed with salts as shown in table III. Based on the predetermined solids content of the prepared carrots at 10% and the final moisture content of the dehydrated product at 6%, the quantity of the salt to be mixed with the vegetable prior to dehydration can be readily calculated.

TABLE III

Carrots dehydrated to 6% moisture, containing 3% sodium chloride and 3% sugar together with different levels of sodium citrate.

| Level of sodium citrate in dehydrated vegetable | Cooking time |
|---|---|
| None | 4 minutes |
| 1% sodium citrate | 3 minutes |
| 2% sodium citrate | 1 1/2 to 2 minutes |
| 4% sodium citrate | 1 minute |

This example shows that the time necessary to produce good textured cooked carrots from the same cut of raw material can be varied widely by selecting the blend of sodium chloride and sodium citrate.

EXAMPLE 4

Stem Ginger

Fresh stem ginger was washed and sliced into shreds 2.5×3 mm. The ginger shreds were mixed with the appropriate weight of salts so that when dried to 7% moisture they contained 10% sodium chloride, 10% sugar and 4% sodium citrate.

The ginger when cooked in boiling water for three minutes was crisp and tender and very closely resembled the texture of fresh stem ginger.

EXAMPLE 5

Cabbage

Savoy cabbage was diced into 20×20×20 mm pieces and steam blanched for two minutes. Surface water was blown off and the cabbage mixed with the required weight of ingredients to give concentrations of added

| Sodium chloride | 5% |
| Sugar | 3% |
| Sodium citrate | 4% |
| Sodium metalbisulfite | 0.1% | in the dehydrated cabbage.

The cabbage was dried initially at 60° C. then at 50° C. to 4% moisture content.

In contrast to normal dehydrated cabbage that cooks in about ten minutes to a mushy product with little residual texture, the treated cabbage cooks in boiling water in three minutes to a crisp, well cooked product with excellent colour, flavour and texture.

EXAMPLE 6

Hot Chillies

Long hot chillies were de-cored and cut into 5 mm slices. Based on a solids content of 9.5%, the slices were quickly mixed with a dry salt mixture calculated to give a final concentration in the product when dried to 16% moisture of:

Sodium chloride 6%

Sodium citrate 3%

The diced product has a water activity of 0.62. It was packed in nitrogen. After 4 months it had excellent colour and when covered with boiling water, rehydrated to an excellent texture in three minutes.

EXAMPLE 7

Green Peas

Frozen peas with a solids content of 23% were passed through a scarifier to slit the skins and then mixed with a dry salt mixture calculated to give a composition of added salts when dried to 22% moisture as follows:

| Sodium chloride | 3% |
| Sodium citrate | 4% |
| Sugar | 3% |

The water activity of the dried product was 0.79. The dried product was packaged and held at −20° C. for 3 months. After storage, the peas directly out of the freezer were added to boiling water and simmered for four minutes. The peas had resumed their original size, were well cooked throughout and were tender without mushiness.

We claim:

1. Quick cooking dehydrated vegetable pieces having incorporated therein sodium chloride at a concentration of at least 2% and an alkali metal carboxylate at a concentration of 1 to 4%, said concentrations being by weight of the quick cooking dehydrated vegetable pieces.

2. The quick cooking dehydrated vegetable pieces as claimed in claim 1 wherein the alkali metal carboxylate is selected from the group comprising sodium citrate, succinate, lactate and malonate.

3. The quick cooking dehydrated vegetable pieces as claimed in claim 1 wherein the sodium chloride is present in concentrations of 2 to 15%.

4. The quick cooking dehydrated vegetable pieces as claimed in claim 1 wherein the vegetable pieces are selected from the group comprising beet, broccoli; green beans, carrot, cabbage, celery root, celery stalk, eggplant, stem ginger, mushrooms, onions, peppers, parsnip, parsley, peas, sweet corn, sweet potatoes and zucchini.

5. The quick cooking dehydrated vegetable pieces as claimed in claim 1 wherein further additives selected from the group comprising sugars, flavourings, nutritional supplements, preservatives, colorants and antioxidants are incorporated in the vegetable pieces.

6. A process of incorporating a mixture of sodium chloride and an alkali metal carboxylate in quick cooking dehydrated vegetable pieces at concentrations of at least 2% sodium chloride and 1 to 4% alkali metal carboxylate by weight of the vegetable pieces comprising partially dehydrating the vegetable pieces to the extent wherein the residual moisture content is between 10% and 45%, adding to the partially dehydrated pieces a predetermined quantity of a solution containing said sodium chloride and alkali metal carboxylate at said concentrations, the quantity of said solution being such that it is totally absorbed by the vegetable and thereafter dehydrating the vegetable pieces to a predetermined moisture content.

7. The process as claimed in claim 6 wherein the alkali metal carboxylate is selected from the group comprising sodium citrate, succinate, lactate and malonate.

8. The process as claimed in claim 6 wherein the sodium chloride is present in concentrations of 2 to 15%.

9. The process as claimed in claim 6 wherein the vegetable pieces are selected from the group comprising beet, broccoli; green beans, carrot, cabbage, celery root, celery stalk, eggplant, stem ginger, mushrooms, onions, peppers, parsnip, parsley, peas, sweet corn, sweet potatoes and zucchini.

10. A process of incorporating a finely divided dry mix of sodium chloride and alkali metal carboxylate into quick cooking vegetable pieces comprising mixing said salts with vegetable pieces immediately prior to or during the early stages of dehydration, said mixture of salts forming by osmosis a concentrated solution of said salts on the surface of the vegetable pieces, said solution being absorbed by the vegetable pieces during dehydration to give a concentration of at least 2% sodium chloride and 1 to 4% alkali metal carboxylates in the dehydrated vegetable pieces.

11. The process according to claim 10 wherein the alkali metal carboxylate is selected from the group comprising sodium citrate, succinate, lactate and malonate.

12. The process according to claim 10 wherein the sodium chloride is present in concentrations of 2 to 15%.

13. The process according to claim 10 wherein the vegetable pieces are selected from the group comprising beet, broccoli; green beans, carrot, cabbage, celery root, celery stalk, eggplant, stem ginger, mushrooms, onions, peppers, parsnip, parsley, peas, sweet corn, sweet potatoes and zucchini.

* * * * *